July 23, 1957
B. R. GRANBERG
2,800,032
DRIVE MECHANISM
Filed Aug. 3, 1955
2 Sheets-Sheet 1
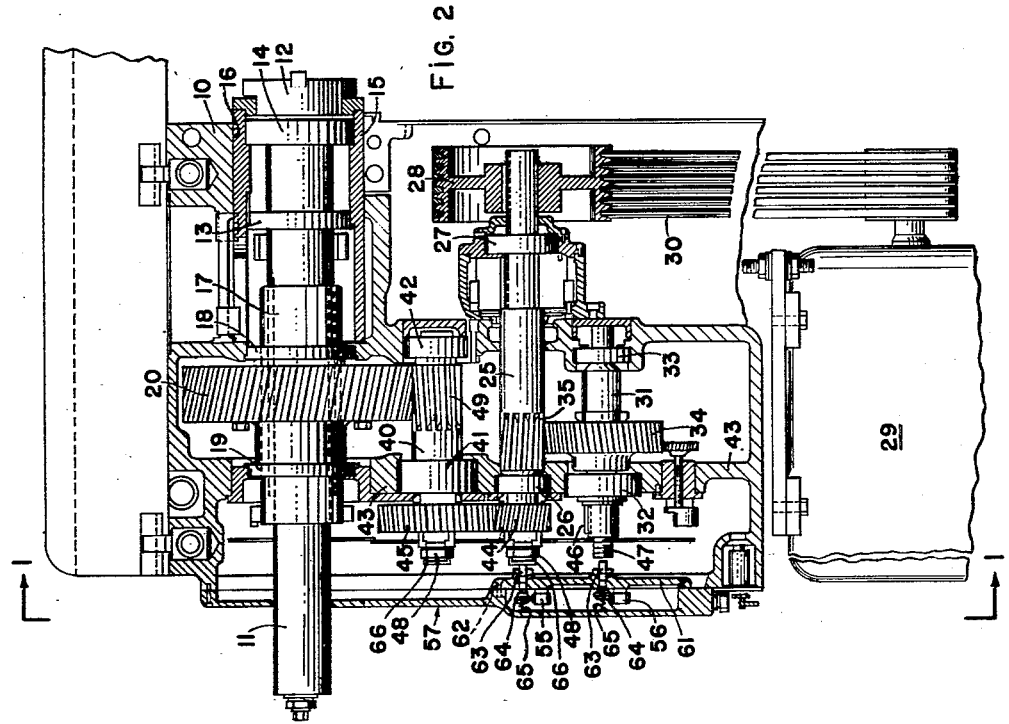
INVENTOR
BENGT R. GRANBERG
BY
Schroeder, Hofgren, Brady & Cooper July 23, 1957　　　　B. R. GRANBERG　　　　2,800,032
DRIVE MECHANISM
Filed Aug. 3, 1955　　　　　　　　　　2 Sheets-Sheet 2
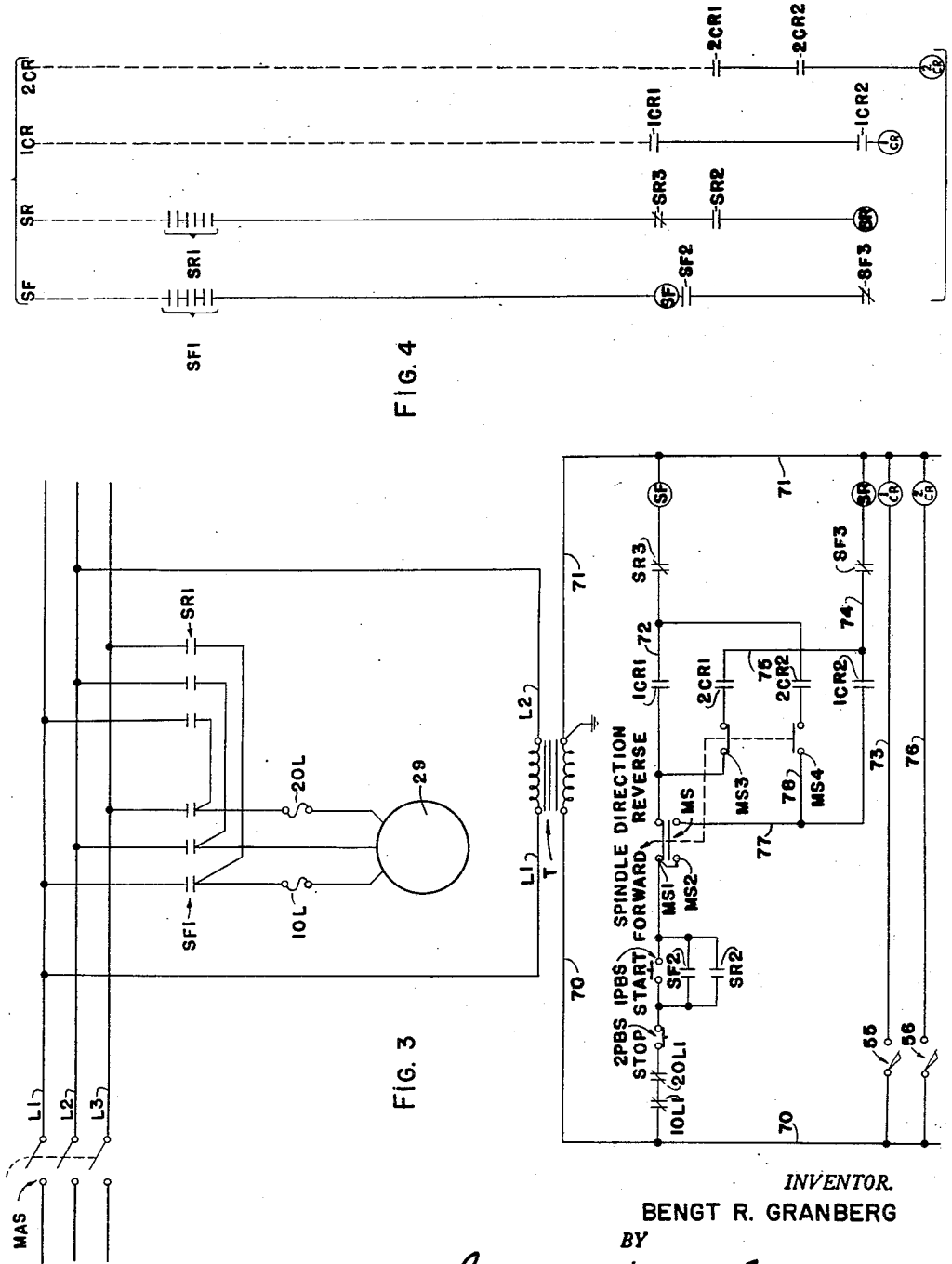
INVENTOR.
BENGT R. GRANBERG
BY

United States Patent Office 2,800,032
Patented July 23, 1957

2,800,032

DRIVE MECHANISM

Bengt R. Granberg, Rockford, Ill., assignor to Sundstrand Machine Tool Co., a corporation of Illinois Application August 3, 1955, Serial No. 526,182

6 Claims. (Cl. 74—472)

This invention relates to mechanisms for driving spindles in machine tools and has for a general object the provision of a new and improved drive mechanism for spindles, of simple construction and employing relatively few gears to obtain a wide range of speeds.

Another object is to provide a new and improved drive mechanism including a pair of shafts mounted in a casing for use alternatively in driving a spindle, reversible means for driving the shafts, removable means including a pickoff gear adapted to be mounted on one or the other of the shafts to drive the spindle, and means engageable by the removable means to energize the driving means either forwardly or reversely depending upon which shaft the removable means is mounted on.

A further object is to provide a new and improved drive mechanism in a spindle head including an intermediate shaft having gearing for driving a spindle, a first pickoff gear on the intermediate shaft for driving the intermediate shaft, a pair of drive shafts and a reversible electric motor for simultaneously driving the drive shafts at different speeds and in opposite directions, a second pickoff gear adapted to be mounted on either of the drive shafts for meshing engagement with the first pickoff gear to drive the spindle at different speeds, a nut for retaining the second pickoff gear on either drive shaft, a movable cover plate adapted to close the spindle head adjacent the pickoff gears, reversing switches on the cover plate operable to condition the circuit to the electric motor for energizing the motor either forwardly or reversely, and a switch actuating part associated with each switch, the pickoff gear retaining nut being engageable with one or the other of said switch actuating parts when the cover plate is moved to closed position so that the motor may be energized either forwardly or reversely depending upon which shaft carries the second pickoff gear and its retaining nut.

Other objects and advantages will become readily apparent from the following detailed description taken in connection with the accompanying drawings, in which:

Fig. 1 is a fragmentary rear elevation of the spindle head of a milling machine embodying my invention, taken at about the line 1—1 of Fig. 2, with the spindle shown in section and with parts including the cover plate broken away;

Fig. 2 is a fragmentary sectional view taken along the line 2—2 of Fig. 1, expanded for the purpose of rendering the disclosure clearer;

Fig. 3 illustrates a wiring diagram for controlling the spindle motor; and

Fig. 4 is a schematic illustration of the relay coils shown in Fig. 3, the contacts controlled thereby, and their relative positions in Fig. 3.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings, in a preferred embodiment, the invention includes a spindle supporting element or head 10, forming a part of a milling machine. The spindle, designated 11, is rotatably mounted in the head 10, and is adapted to support a cutter at the forward end 12 for performing milling operations on workpieces supported in the milling machine. At the forward end, the spindle is supported in bearings 13 and 14, held in a quill 15, slidably mounted in a cylindrical bore 16 in the head to facilitate adjustment of the spindle longitudinally of its axis. A mid-portion of the spindle 11 is splined to a bearing sleeve 17, rotatably mounted in the head by means of bearings 18 and 19. The spindle is driven by means of a gear 20 mounted on the sleeve 17. The splined connection of the spindle to the bearing sleeve permits relative sliding movement on longitudinal adjustment of the quill 15.

In order to obtain a wide range of spindle speeds with a relatively small number of gears, the drive mechanism for the spindle includes an arrangement of shafts and gearing enabling the use of pickoff gear sets with either of two power driven shafts which rotate at different speeds.

The drive mechanism includes a power driven shaft 25 rotatably mounted in the head 10 by means of anti-friction bearings 26 and 27. At its forward end, the shaft 25 carries a multiple grooved pulley 28 which is driven from an electric motor 29 by means of a plurality of V-belts 30. A second power driven shaft 31 is rotatably mounted in the head by means of anti-friction bearings 32 and 33. The shaft 31 is driven by means of a gear 34 secured to the shaft 31 and meshing with a pinion 35 formed on the shaft 25. Obviously, the shafts 25 and 31 will be driven in opposite directions and the shaft 31 will be driven at a much slower speed than the shaft 25.

The drive from either of the power driven shafts to the spindle includes an intermediate shaft 40 which is rotatably mounted in anti-friction bearings 41 and 42 supported in the head. As shown in Fig. 2, the left hand end of the shaft 40 and the left hand end of the power driven shafts 25 and 31 project through an interior wall 43 formed in the head 10 and are fashioned on their outer or left hand ends for the reception of pickoff gears, such as those shown at 44 and 45. The projecting end of each of the shafts 25, 31 and 40 is preferably provided with a key 46 which engages in a suitable key way in the pickoff gear, and has a threaded end 47 for the reception of a retaining nut 48 which, when tightened, functions to hold the pickoff gear on the shaft. The drive from the intermediate shaft 40 to the spindle 11 comprises a pinion 49 formed on the shaft 40 and meshing with the gear 20 secured on the bearing sleeve 17. As illustrated in Fig. 2, the drive to the intermediate shaft 40 is through the power driven shaft 25 and the pickoff gears 44 and 45.

It is the practice in manufacturing machine tools equipped with pickoff gears to provide a specified number of sets or pairs of pickoff gears so that the purchaser will have on hand the necessary gears for changing the speed of the spindle within a definite range. The range is determined by that set or pair of gears which is made up of the largest gear and the smallest gear. Such a set may resemble that illustrated in the drawing wherein the smallest gear 44 is mounted on the power driven shaft 25 and the largest gear 45 is mounted on the intermediate shaft 40. This arrangement, therefore, provides for the lowest spindle speed possible when driving through the shaft 25. By reversing the pickoff gears so that the smallest gear 44 is mounted on the intermediate shaft 40 and the largest gear 45 is mounted on the power driven shaft 25, the spindle will be driven at the highest available speed. It is to be understood that the gears in other sets of pickoff gears must all be designed to fit the ends of the shafts 25, 31 and 40, and the predetermined spacing between the axes of the shafts. The other sets are generally provided in sizes ranging between those illustrated.

In order to increase the range and the number of speeds at which the spindle 11 may be driven without requiring additional sets of pickoff gears, the invention includes the second drive shaft 31 hereinbefore described. The actual relationship of the shaft 31 to the shaft 40 is shown in Fig. 1, and as shown there, the shaft 31 is positioned somewhat to one side of the intermediate shaft 40, the axis of the shaft 31 being located at a distance from the axis of the shaft 40 exactly equal to the distance between the axis of the shaft 25 and the shaft 40. This arrangement is to permit the driving gear of each set of pickoff gears to be mounted either on the power driven shaft 25 or on the power driven shaft 31, the other pickoff gear of each set being mounted at all times on the intermediate shaft 40. With the reduction gearing shown intermediate the shaft 25 and the shaft 31, the spindle speeds available when the shaft 31 is used for mounting the driving pickoff gear are substantially lower than those available when the shaft 25 is used for mounting the driving pickoff gear.

In order to drive the spindle from the shaft 31, instead of from the shaft 25 as illustrated in Fig. 2, it is merely necessary to remove the retaining nut 48 and the driving pickoff gear 44 from the shaft 25, and to replace these parts on the shaft 31. The drive from the power driven shaft 25 to the spindle 11 will then be through the gearing 35 and 34, the shaft 31, the gears 44 and 45, the shaft 40, and gears 49 and 20. It will be understood, of course, that other gear sets may be used in driving through the shaft 31.

When the driving pickoff gear is placed on the shaft 31, the direction of rotation of the spindle 11 would be reversed. This would normally be undesirable, and in order that the direction of rotation of the spindle will be the same whether the driving pickoff gear is placed on the shaft 25 or the shaft 31, the invention includes reversing means connected in circuit with the driving motor 29 and operable to automatically reverse the direction of the motor 29, when the driving pickoff gear is moved from one of the drive shafts to the other.

The reversing means includes a pair of switches 55 and 56 supported on a hinged cover plate 57 which encloses the spindle head 10 adjacent the projecting end portions of the shafts 25, 31 and 40. The cover plate 57 is supported by hinges 58 and 59 which permit the cover plate to be easily opened to readily provide access to the projecting end portions of the drive shafts 25 and 31 and the intermediate shaft 40 for changing the pickoff gears. The cover plate may be latched in closed position by conventional means such as that shown generally at 60 and including a manually rotatable shaft having an eccentric projection adapted to latch behind a shoulder formed on the head 10.

The switches 55 and 56 are mounted on a supporting plate 61 secured to the cover plate 57 by screws 62. The switches are operated by means of plungers 63, one associated with each of the switches. Each of the plungers is slidably mounted in the plate 61 and provided with an enlarged camming portion 64 adjacent the outer end arranged to actuate the associated switch. The plungers 63 are each biased inwardly of the head 10 to a non-actuating position by means of a spring 65. The switch 55 is positioned on the cover plate so that its actuating plunger 63 is substantially coaxial with the shaft 25 when the cover is closed; and the switch 56 is arranged with its actuating plunger 63 substantially coaxial with shaft 31. The retaining nuts 48 each include an extension in the form of a bent U-shaped part 66 welded or otherwise secured to the nut. At the inner end, the plunger 63 associated with the switch 55 is engageable with the extension on the retaining nut 48 on shaft 25 when the driving pickoff gear is placed on the shaft 25 and the cover plate 57 moved to closed position. In like manner, the plunger 63 associated with the switch 56 is engageable with the extension on the retaining nut 48 on shaft 31 when the driving pickoff gear is placed on the shaft 31.

The switch 55 may be connected to condition the motor circuit for energizing the motor 29 in a forward direction, for example, and the switch 56 connected to condition the circuit for energizing the motor reversely. Thus, when the driving pickoff gear, such as that indicated at 44, is mounted on the shaft 25 and the cover plate 57 moved to closed position, the retaining nut 48 will engage the plunger associated with the switch 55 so that the driving motor 29 will be energized forwardly. These conditions are illustrated in Fig. 2, and as shown there, the plunger associated with the switch 56 will not be actuated inasmuch as the driving pickoff gear and the retaining nut are not mounted on the shaft 31.

When the driving pickoff gear is removed from the shaft 25 and placed on the shaft 31, and the cover plate moved to closed position, the switch 55 will no longer be actuated. Instead, the switch 56 will be actuated so that the driving motor 29 will be energized reversely. In this manner, the direction of the driving motor 29 is automatically reversed in changing the driving pickoff gear from one of the drive shafts to the other.

When the cover plate 57 is opened for substituting pickoff gears for those shown at 44 and 45 or for changing the gear 44 from one of the shafts 25 and 31 to the other, the spring 65 will move the plunger 63 to a position in which the switches 55 and 56 are not actuated so that the spindle motor 29 cannot be started before the cover 57 is closed, thus providing an automatic safety measure.

In Figure 3, there is illustrated a suitable circuit for controlling the spindle motor 29. The motor is connected to a suitable three phase source of supply indicated by the lines L1, L2 and L3 through overload relays 10L and 20L, and through reversing circuits, one of which includes the normally open contacts SF1 for energizing the motor forwardly and the other of which includes normally open contacts SR1 for energizing the motor reversely. A master switch MAS is provided in the supply lines L1, L2 and L3. The overload relays 10L and 20L control contacts in the control circuit so that in response to an overload current in either relay, the circuit to the motor 29 will be broken, as will appear. The contacts SF1 and SR1 are controlled by relay coils SF and SR respectively, in the control circuit to be described.

The control circuit is supplied from a transformer T having its primary connected across the lines L1 and L2, and having wires 70 and 71 leading from the secondary. The relay coil SF is connected across the wires 70 and 71 by means of a wire 72 which includes normally open contacts 1CR1. The contacts 1CR1 are controlled by a coil 1CR in a wire 73 connected across the wires 70 and 71 and including the normally open switch 55 which is supported on the hinged cover plate 57.

The coil SR is connected in a wire 74 connected to the wire 71 and having a wire 75 leading therefrom to the wire 72 and including normally open contacts 2CR1. The contacts 2CR1 are controlled by a coil 2CR in wire 76 connected across the wires 70 and 71 and including the normally open switch 56 which is supported on the hinged cover plate 57.

The circuit described above functions in the following manner. Assuming the pickoff gear 44 has been placed on the drive shaft 25 and the master switch MAS in lines L1, L2 and L3 closed, and the cover 57 closed, the normally open switch will be closed to complete a circuit through the wire 73, energizing the coil 1CR and closing the normally open contacts 1CR1 in wire 72. The spindle motor 29 may now be energized by depressing a normally open push button "start" switch 1PBS in wire 72 to complete a circuit through the wire 72 to energize the coil SF. This closes the normally open contacts SF1 in circuits to the motor 29 to energize the motor forwardly. Energization of the coil SF also closes contacts SF2 in parallel with the switch 1PBS to complete a holding circuit so that when the switch is released the coil SF will remain energized.

Assuming the pickoff gear 44 has been placed on the drive shaft 31, the normally open switch 56 will be closed when the cover 57 is closed, energizing the coil 2CR and closing the contacts 2CR1 in wire 75. Now when the "start" switch 1PBS is closed, the coil SR will be energized, closing the contacts SR1 to energize the motor 29 reversely, and closing the contacts SR2 in parallel with the switch 1PBS so that the coil SR will remain closed when the switch is released. Although the motor 29 is energized reversely at this time, since the drive to the spindle is now through the shaft 31 which rotates oppositely from the shaft 29, the spindle will be driven forwardly.

Normally closed contacts SR3 and SF3 are provided in wires 72 and 74, respectively, in circuit with the coils SF and SR, respectively, so that when one of the coils is energized, its contacts in circuit with the other coil are opened, to prevent the other coil from being energized at the same time.

Under some circumstances it may be desirable to have the spindle rotate reversely, that is, in a direction opposite to the rotation provided by the operation described above. To this end, the circuit includes a manually settable "direction" switch MS having normally closed contacts MS1 in wire 72 and normally closed contacts MS3 in wire 75 which permit the operation already described in securing forward rotation of the spindle. The switch MS also includes normally open contacts MS2 in a wire 77 and normally open contacts MS4 in a wire 78 in circuit to the coil SF. If reverse rotation of the spindle is desired, the switch MS is set to open the contacts MS1 and MS3, and to close the contacts MS2 and MS4.

Under these conditions, when the pickoff gear 44 is placed on the shaft 25 and the cover 57 closed, energizing the coil 1CR, the contacts 1CR2 in wire 77 are closed to energize the coil SR. This results in energizing the motor 29 reversely, instead of forwardly, as in the operation previously described. Also, when the pickoff gear 44 is placed on drive shaft 31, and the cover 57 closed, energizing the coil 2CR, contacts 2CR2 in wire 78 are closed to energize the coil SF which results in energizing the motor 29 forwardly. But since the drive is now through the shaft 31, which rotates oppositely from the shaft 25, the spindle will be driven reversely.

The spindle may be stopped whenever desired by means of a normally closed push button "stop" switch 2PBS in the wire 72, which may be depressed to break the circuit to coils SF and SR, deenergizing the motor 29. If at any time an overload current develops in the circuit to the motor 29, the overload relays 10L and 20L function to open the normally closed contacts 10L1 or 20L1 in wire 72, which results in deenergizing the motor.

I claim:

1. In a milling machine, a spindle head, a spindle rotatably mounted in the spindle head, an intermediate shaft rotatably mounted in the spindle head and having gearing to drive the spindle, a first pickoff gear on an end portion of the intermediate shaft for driving the intermediate shaft, a pair of drive shafts rotatably mounted in the spindle head, means including a reversible electric motor for simultaneously driving the drive shafts at different speeds and in opposite directions, said drive shafts each having an end portion adjacent said end portion of the intermediate shaft, a second pickoff gear adapted to be mounted on said end portion of either drive shaft for meshing engagement with the first pickoff gear on the adjacent end portion of said intermediate shaft, a nut for retaining the second pickoff gear on either drive shaft, whereby the second pickoff gear may be placed on either of said drive shafts to drive the spindle at different speeds, a hinged cover plate mounted on the spindle head and adapted, in closed position, to close said spindle head adjacent said end portions of said shafts, a pair of switches on said cover plate, one adjacent said end portion of each drive shaft, one of the switches being operable to condition the circuit to the electric motor for energizing the motor forwardly, and the other switch being operable to condition the circuit to the electric motor for energizing the motor reversely, and a switch actuating part associated with each switch, the pickoff gear retaining nut being engageable with one of the switch actuating parts to actuate the associated switch when the second pickoff gear and the retaining nut are mounted on one drive shaft, and being engageable with the other switch actuating part to actuate the other switch when the second pickoff gear and the retaining nut are mounted on the other drive shaft.

2. In a milling machine, a spindle head, a spindle rotatably mounted in the spindle head, gearing mounted in the spindle head to drive the spindle, a pair of drive shafts rotatably mounted in the spindle head, means including a reversible electric motor for simultaneously driving the drive shafts at different speeds and in opposite directions, a pickoff gear adapted to be mounted on either drive shaft for meshing engagement with said gearing, a nut for retaining the pickoff gear on either drive shaft, whereby the pickoff gear may be placed on either of said drive shafts to drive the spindle at different speeds, a hinged cover plate mounted on the spindle head and adapted, in closed position, to close said spindle head adjacent said drive shafts, reversing switches on said cover plate adjacent said drive shafts operable to condition the circuit to the electric motor for energizing the motor either forwardly or reversely, and a switch actuating part associated with each switch, the pickoff gear retaining nut being engageable with one of the switch actuating parts to actuate the associated switch when the second pickoff gear and the retaining nut are mounted on one drive shaft, and being engageable with the other switch actuating part to actuate the other switch when the second pickoff gear and the retaining nut are mounted on the other drive shaft.

3. In a milling machine, a spindle head, a spindle rotatably mounted in the spindle head, gearing mounted in the spindle head and connected to drive the spindle, a pair of drive shafts mounted in the spindle head, mechanism for simultaneously driving the drive shafts at different speeds, removable means including a pickoff gear adapted to be mounted on either of said drive shafts for driving connection with said gearing, a movable cover plate for the spindle head, and reversing switch means on the cover plate having switch actuating parts alternatively operable to condition the driving mechanism for rotation either forwardly or reversely, said removable means, when mounted on one drive shaft, being engageable with one of said switch actuating parts and, when mounted on the other drive shaft, being engageable with the other switch actuating part.

4. In a drive mechanism, a casing, a pair of drive shafts mounted in the casing, means for driving the drive shafts, removable means including a driving pickoff gear adapted to be mounted on either drive shaft, a cover plate for closing the casing, and reversing means on said cover plate having a pair of actuating parts alternatively operable to condition the driving means for rotation either forwardly or reversely, said removable means, when mounted on one drive shaft, being engageable with one of the actuating parts to condition the driving means for rotation in one direction, and, when mounted on the other drive shaft, being engageable with the other actuating part to condition the driving means for rotation in the other direction.

5. In a spindle drive, a spindle, a pair of drive shafts rotatable in opposite directions with respect to each other, means including a reversible motor for rotating said drive shafts at different speeds, means including a pickoff gear adapted to be mounted on either of said drive shafts for driving the spindle, and means responsive to the location of the pickoff gears for controlling the direction of rotation of said reversible motor so as to always drive the spindle in the same direction.

6. In a milling machine, the spindle head, a spindle rotatably mounted in the spindle head, gearing mounted in the spindle head and connected to drive the spindle, a pair of drive shafts mounted in the spindle head, mechanism for simultaneously driving the drive shafts at different speeds, removable means including a pickoff gear adapted to be mounted on either of said drive shafts for driving connection with said gearing, a movable cover plate for closing the spindle head, reversing switch means on the cover plate having switch actuating parts alternatively operable to condition the driving mechanism for rotation either forwardly or reversely, said removable means, when mounted on one drive shaft, being engageable with one of said switch actuating parts and, when mounted on the other drive shaft, being engageable with the other switch actuating part, and means biasing said switch actuating parts to disable the driving mechanism when said cover plate is moved to open the spindle head.

References Cited in the file of this patent
UNITED STATES PATENTS

| | | |
|---|---|---|
| 1,841,601 | Higbee | Jan. 19, 1932 |
| 2,183,514 | Granberg et al. | Dec. 12, 1939 |
| 2,340,096 | Woodbury et al. | Jan. 25, 1944 |
| 2,688,046 | Norton et al. | Aug. 31, 1954 |